US012641116B2

(12) United States Patent
Ezrielev et al.

(10) Patent No.: US 12,641,116 B2
(45) Date of Patent: May 26, 2026

(54) DATA-LEAKAGE PREVENTION FOR PRE-RANSOMWARE'S ENCRYPTION ACTIVITY VIA TERMINATION OF NETWORK-SYSCALL COMMANDS USING INTERCEPTION ANALYSIS

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 18/188,643

(22) Filed: Mar. 23, 2023

(65) Prior Publication Data

US 2024/0323225 A1     Sep. 26, 2024

(51) Int. Cl.
H04L 9/40          (2022.01)

(52) U.S. Cl.
CPC ...... H04L 63/1466 (2013.01); H04L 63/1425 (2013.01)

(58) Field of Classification Search
CPC ........................ H04L 63/1466; H04L 63/1425

USPC ........................................................... 726/23
See application file for complete search history.

(56) References Cited

U.S. PATENT DOCUMENTS

| | | | | |
|---|---|---|---|---|
| 2007/0240207 A1* | 10/2007 | Belakhdar | ............. | G06F 21/552 |
| | | | | 726/12 |
| 2008/0016339 A1* | 1/2008 | Shukla | ..................... | G06F 21/54 |
| | | | | 713/164 |
| 2021/0064751 A1* | 3/2021 | Li | ....................... | G06F 18/2413 |

FOREIGN PATENT DOCUMENTS

| | | | | | |
|---|---|---|---|---|---|
| EP | | 1265445 A2 * | 12/2002 | ........... | H04Q 3/0025 |
| JP | | 2007228599 A * | 9/2007 | | |

\* cited by examiner

*Primary Examiner* — Aubrey H Wyszynski
(74) *Attorney, Agent, or Firm* — Workman Nydegger

(57)                ABSTRACT

One example method includes intercepting a call issued by an application, at a first tier of an analytical structure, determining if the call is a networking call, when the call is determined to be a networking call, determining, at a second tier of the analytical structure, whether the networking call is requesting data, when the networking call is determined to be requesting data, determining at a third tier of the analytical structure, a classification of the data that is being requested, when the classification indicates that the data is not classified as public, or has not classified, determining, at a fourth tier of the analytical structure whether a destination IP address for the requested data is an internal IP address, and when the destination IP address is determined to be an external IP address, terminating the call.

18 Claims, 2 Drawing Sheets

DATA-LEAKAGE PREVENTION FOR PRE-RANSOMWARE'S ENCRYPTION ACTIVITY VIA TERMINATION OF NETWORK-SYSCALL COMMANDS USING INTERCEPTION ANALYSIS

FIELD OF THE INVENTION

Embodiments of the present invention generally relate to detection of ransomware. More particularly, at least some embodiments of the invention relate to systems, hardware, software, computer-readable media, and methods, for detecting and halting ransomware activity.

BACKGROUND

Many ransomware approaches involve encrypting data and then demanding a ransom from the data owner, after which a decryption key may be supplied by the malicious actor to the data owner. However, ransomware has evolved and become more complex in its implementation and operation.

For example, some later-developed ransomware is not limited simply to encrypting files and other data, but also leak data, which may be confidential and proprietary, to the public at large and/or various entities. In particular, such ransomware may initially leak some or all of the targeted customer data, and afterwards encrypt that data so that the data owner needs a decryption key to retrieve the encrypted data. Developments such as these present new challenges in the field of identifying, and dealing with, ransomware.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
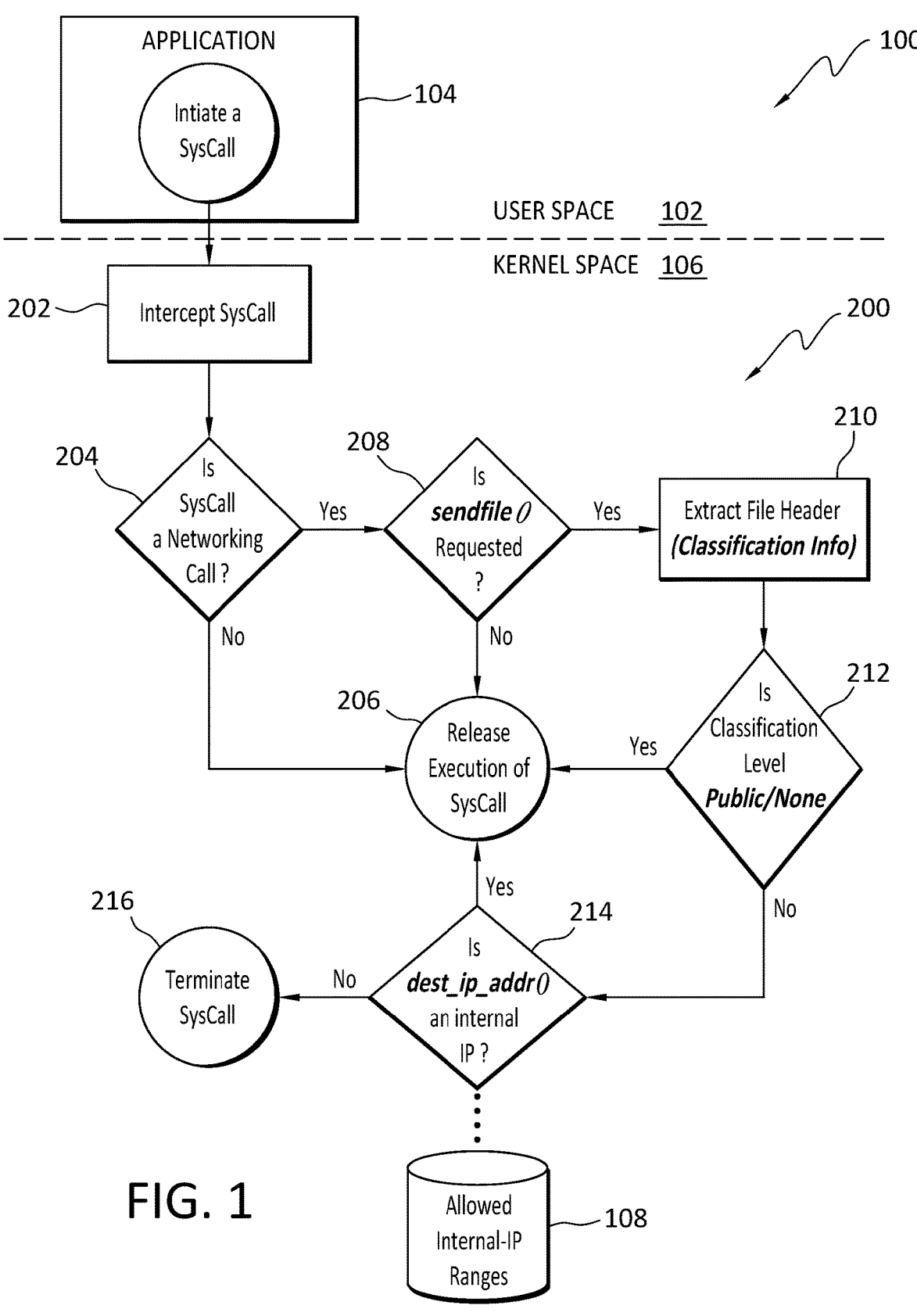
FIG. 1 discloses aspects of an example operating environment, and method, according to one embodiment.

Embodiments of the present invention generally relate to detection of ransomware. More particularly, at least some embodiments of the invention relate to systems, hardware, software, computer-readable media, and methods, for detecting and halting ransomware activity.

In general, an embodiment may be implemented in a Linux® environment that comprises a user space, where one or more applications may be running, and further comprises a kernel space, where part, or all, of an embodiment of the invention may be implemented. The scope of the invention is not limited to any particular environment however.

In one example embodiment, a kernel space may be implemented that comprises various security layers. A call, such as for a particular service for example, from an application in the userspace may be directed to an operating system (OS) running in the kernel space. Within the kernel space, the call may be intercepted and subjected to a number of different checks in the various security layers. In general, the security layers may check to determine the legitimacy of the call. In one embodiment, a check may be performed to determine if data leakage to the public and/or some other entity, such as may be implemented as part of a ransomware attack, has occurred, and/or is occurring, in connection with the call that was made, or other activity that is taking place. Because some ransomware operates by initially leaking some or all of the targeted data, that is, before encrypting that data, detection of data leakage, as implemented by example embodiments, may both halt the data leakage, and may also prevent encryption of the data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that newer and more sophisticated ransomware attacks, such as those that involve data leakage, may be detected and stopped. An embodiment may leverage knowledge and functionality regarding data leakage to prevent data encryption by ransomware. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Environment and Method

With reference to FIG. 1, one example embodiment of the invention may be implemented in an operating environment 100, which is provided here only by way of example, and not limitation. The example operating environment 100 may comprise a userspace 102, such as a Linux® userspace for example, in which one or more applications 104 are operating. The scope of the invention is not limited to such a userspace however and, further, the application 104 may comprise any type of application that issues calls for services and/or data, such as the examples disclosed herein.

FIG. 1 further discloses an example method 200 according to one embodiment of the invention. The method 200 may be performed, for example, by an application running in a kernel space, although that is not necessarily required. In general, an embodiment may implement data-leakage prevention for ransomware pre-encryption activity. That is, an embodiment may detect and stop data leakage, which, in some ransomware implementations, is a precursor to data encryption by the ransomware, since some types of ransomware leak data to unauthorized entities, and/or to the public at large, before the ransomware encrypts the data. Due to its configuration and operation, the ransomware may provide two possible lines of attack with regard to obtaining a possible ransom from the data owner. Namely, the entity associated with the ransomware may threaten the data owner with an uncontrolled leak of the data to unauthorized parties unless a ransom is paid, and/or the entity associated with the ransomware may advise the data owner that a decryption key to the data encrypted by the ransomware will not be provided to the data owner unless or until a ransom is paid. Thus, some ransomware is relatively efficient in terms of its ability to implement data theft, and to make that data theft financially profitable.

Thus, the example method 200 may detect, and reduce, eliminate, or prevent, data leakage so as to halt the operation of ransomware. In an embodiment, this may be performed by intercepting, and analyzing, calls from one or more applications, such as the application 104 for example. That is, an embodiment may use various security layers to check the legitimacy of particular activities, such as calls from applications, and validate whether or not the activity comprises data leakages. Where data leakage is determined to have occurred, and/or is occurring, an embodiment may operate to terminate certain calls, such as network-syscall commands for example, through the use of an interception analysis. By terminating a call, an embodiment may prevent the ransomware from continuing to leak data, and prevent the ransomware from encrypting any data. In this way, an embodiment may operate to halt ransomware activity.

In an embodiment then, a multi-tiered analysis may be performed, by a multi-tiered analytical structure, to identify possibly problematic processes. The outcome of the respective analyses performed at each tier may determine the further progression of the example method 200. In an embodiment, it may not be necessary to employ all the tiers of analysis.

With particular attention now to the example method 200, it is noted that various particular example commands and operations, such as may be used in Linux® environments, are used to demonstrate aspects of the operation of one embodiment. These are presented only by way of illustration, and are not intended to limit the scope of the invention in any way. That is, while an embodiment may be employed in a Linux® environment, that is not required.

The example method 200 may begin when a SysCall, or system call, from an application is intercepted 202 before being acted upon by the kernel. The system call may be a call for access to data, performance of services or processes, or for various other operations. In an embodiment, a system call or request for data may be of particular interest. In an embodiment, the system call may identify one or more files, or other groupings of data, that the application has asked to access. In an embodiment the call that is intercepted 202 may be one of hundreds, thousands, or more, of calls being sent from the user space 102 to the kernel space 106.

After the system call has been intercepted 202, a check 204 may be performed by a first security layer. The check 204 may determine whether the system call involves communications over a network or a request for network communication, such as could be initiated, for example, by ransomware, as well as by legitimate applications. That is, the check 204 may determine whether the system call is a networking call, which may be used when the calling entity, such as an application, wants to transfer data between entities, one of which may be the application. Thus, the check 204 is a threshold check, which may be part of a tiered approach, that may determine whether or not further analysis of the system call may be required—'YES' if a networking call, and 'NO' if not a networking call. Note that at 204, it has not yet been determined, if the system call has been identified as a network call, whether or not the network call is requesting data. On the other hand, if it is determined at 204 that the system call is not a networking call, the method 200 may advance to 206 where the system call may be released by the kernel for execution.

With continued reference to FIG. 1, if a determination is made at 204 that the intercepted system call is a networking call, a next level, or tier, check 208 may be performed to determine whether the networking call comprises a sendfile( ) request. A sendfile( ) request, if acted upon by the kernel, may result, for example, in data being copied from the kernel space to the user space where the data can be accessed by the application, or may result in the copying/sending of data, by the kernel or at the direction of the kernel, to a location/host/entity/buffer, for example, that is accessible to the calling application.

If it is determined 208 that the networking system call does not comprise a sendfile( ) request, the method 200 may return to 206, where the networking system call may be released by the kernel for execution. If, on the other hand, it is determined at 208 that the networking system call does include a sendfile( ) request, the method 200 may advance to 210 where the next tier check is performed.

In general, the check 210 may extract information, which may comprise metadata, about the data that is being requested. In one particular embodiment, one or more file headers may be extracted from the files to which access has been requested by the calling application. A file header may comprise various information about the file from which the file header is extracted. For example, the file header may indicate the file type, such as by way of the file extension, which may be determined by the native application that was used to create/modify the file. Thus, the file type may indicate the classification of the file as having been generated by a particular application. As another example, the file header may include information indicating a security level for the file. For example, a file header may indicate that a file is confidential, or may indicated that the file is a public file not subject to security restrictions or limitations on use and distribution. As some final examples, a file header may specify, for example, the size of the file, and when the file was created or last modified.

In the example of FIG. 1, after the file header is extracted 210, and at the next tier or layer of analysis, a classification level in the file header may be checked 212. In an embodiment, a determination may be made at 212 as to whether or not the requested file has a 'public' or 'none' classification level. If either of these classification levels are found, the determination 212 may be that allowing the calling application to access the file does not represent a security concern, and the method 200 may accordingly proceed to 206.

If it is determined at 206 that the classification level is something other than 'public' or 'none,' the method 200 may advance to 214. At this point, in one embodiment, a final check 214 may be performed to determine the intended destination for the requested file, or other data. That is, in an embodiment, the inquiry at 214 may be one as to whether or not the dest_ip_addr( ) is an IP address that is internal to an organization or other entity that is trying to protect itself against ransomware, or is an IP address outside the organization, which may indicate the that the caller is ransomware. In an embodiment, the determination at 216 may be made by accessing a database 108 that comprises a list of allowed internal IP addresses. If a search of the database 108 does not indicate that the IP address for the destination of the requested data is not an internal IP address, the method 200 may advance to 216 where the syscall that was issued by the application may be terminated by the kernel.

By terminating 216 the syscall, an embodiment may prevent the leakage of the requested data, as well as preventing the leakage of any other data. Because, as noted, some ransomware operates by first leaking data, then encrypting the data, an embodiment may also, by preventing the leakage of the requested data, also prevent the encryption of the data. In this way, an embodiment may operate to halt the activity of the ransomware.

B. Example Methods

It is noted with respect to the disclosed methods, including the example method of FIG. 1, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

C. Further Example Embodiments

Following are some further example embodiments of the invention. These are presented only by way of example and are not intended to limit the scope of the invention in any way.

Embodiment 1. A method, comprising: intercepting a call issued by an application; at a first tier of an analytical structure, determining if the call is a networking call; when the call is determined to be a networking call, determining, at a second tier of the analytical structure, whether the networking call is requesting data; when the networking call is determined to be requesting data, determining at a third tier of the analytical structure, a classification of the data that is being requested; when the classification indicates that the data is not classified as public, or has not classified, determining, at a fourth tier of the analytical structure whether a destination IP address for the requested data is an internal IP address; and when the destination IP address is determined to be an external IP address, terminating the call.

Embodiment 2. The method as recited in any preceding embodiment, wherein the operations are performed in a kernel space.

Embodiment 3. The method as recited in any preceding embodiment, wherein determination of the classification of the data comprises extracting header information from a file that was requested by the networking call.

Embodiment 4. The method as recited in any preceding embodiment, wherein when the destination IP address is determined to be an external IP address, the call that was intercepted is inferred to be generated by ransomware.

Embodiment 5. The method as recited in any preceding embodiment, wherein the application comprises ransomware, and terminating the call halts data leakage by the application.

Embodiment 6. The method as recited in any preceding embodiment, wherein when the call is not a networking call, the call is released for execution.

Embodiment 7. The method as recited in any preceding embodiment, wherein when the networking call is not requesting data, the call is released for execution.

Embodiment 8. The method as recited in any preceding embodiment, wherein when the classification is public, or there is no classification, the networking call is released for execution.

Embodiment 9. The method as recited in any preceding embodiment, wherein when the destination IP address is an internal IP address, the networking call is released for execution.

Embodiment 10. The method as recited in any preceding embodiment, wherein the application comprises ransomware, and terminating the call prevents encryption of the data by the application.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 2:
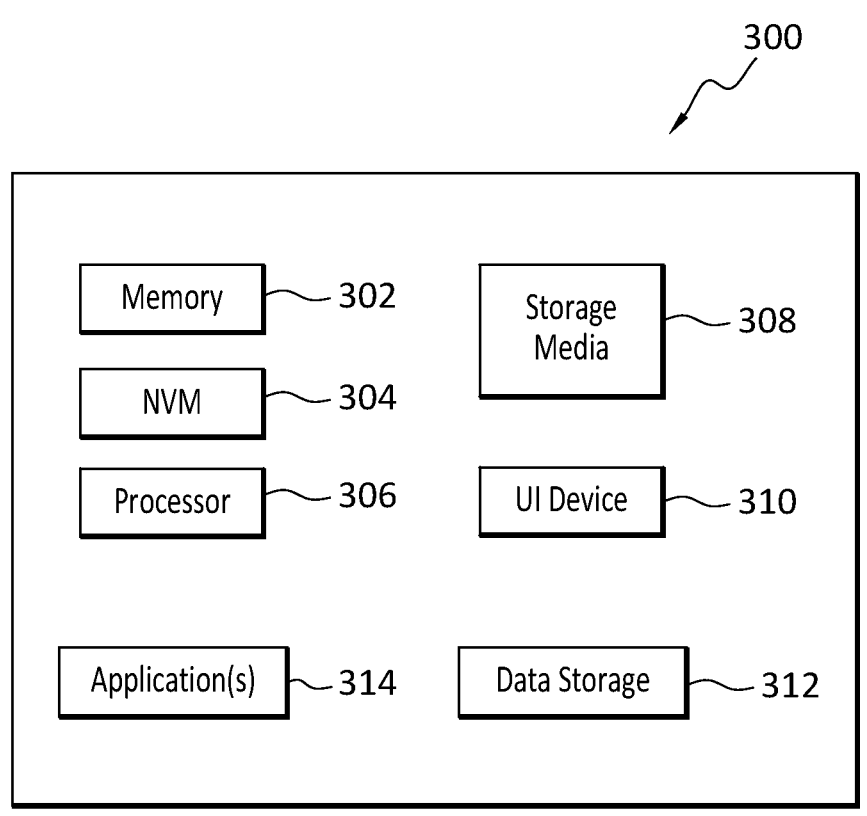
FIG. 2 discloses aspects of a computing entity configured and operable to perform any of the disclosed methods, processes, and operations.

With reference briefly now to FIG. 2, any one or more of the entities disclosed, or implied, by FIG. 1, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 2.

In the example of FIG. 2, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising operations that include:
    intercepting a system call issued by an application operating within an operating system;
    at a first tier of an analytical structure, determining if the system call is a networking call;
    when the system call is determined to be a networking call, determining, at a second tier of the analytical structure, whether the networking call is requesting data;
    when the networking call is determined to be requesting data, determining at a third tier of the analytical structure, a classification of the data that is being requested;
    when the classification indicates that the data is not classified as public, or has not been classified, determining, at a fourth tier of the analytical structure whether a destination Internet protocol (IP) address for the requested data is an internal IP address or an external IP address; and
    when the destination IP address, to which the data is requested to be transmitted by the networking call, is determined to be the external IP address, terminating the system call, and when the destination IP address is determined to be the internal IP address, releasing the system call for execution.

2. The method as recited in claim 1, wherein the operations are performed in a kernel space within the operating system.

3. The method as recited in claim 1, wherein determination of the classification of the data comprises extracting header information from a file that was requested by the networking call.

4. The method as recited in claim 1, wherein when the destination IP address is determined to be the external IP address, the system call that was intercepted is inferred to be generated by ransomware.

5. The method as recited in claim 1, wherein the application comprises ransomware, and terminating the system call halts data leakage by the application.

6. The method as recited in claim 1, wherein when the system call is not a networking call, the system call is released for execution.

7. The method as recited in claim 1, wherein when the networking call is not requesting data, the system call is released for execution.

8. The method as recited in claim 1, wherein when the classification is public, or there is no classification, the networking call is released for execution.

9. The method as recited in claim 1, wherein the application comprises ransomware, and terminating the system call prevents encryption of the data by the application.

10. A non-transitory storage medium having stored therein instructions that are executable by one or more hardware processors to perform operations comprising:

intercepting a system call issued by an application operating within an operating system;

at a first tier of an analytical structure, determining if the system call is a networking call;

when the system call is determined to be a networking call, determining, at a second tier of the analytical structure, whether the networking call is requesting data;

when the networking call is determined to be requesting data, determining at a third tier of the analytical structure, a classification of the data that is being requested;

when the classification indicates that the data is not classified as public, or has not been classified, determining, at a fourth tier of the analytical structure whether a destination internet protocol (IP) address for the requested data is an internal IP address or an external IP address; and when the destination IP address, to which the data is requested to be transmitted by the networking call, is determined to be the external IP address, terminating the system call, and when the destination IP address is determined to be the internal IP address, releasing the system call for execution.

11. The non-transitory storage medium as recited in claim 10, wherein the operations are performed in a kernel space within the operating system.

12. The non-transitory storage medium as recited in claim 10, wherein determination of the classification of the data comprises extracting header information from a file that was requested by the networking call.

13. The non-transitory storage medium as recited in claim 10, wherein when the destination IP address is determined to be the external IP address, the system call that was intercepted is inferred to be generated by ransomware.

14. The non-transitory storage medium as recited in claim 10, wherein the application comprises ransomware, and terminating the system call halts data leakage by the application.

15. The non-transitory storage medium as recited in claim 10, wherein when the call is not a networking call, the system call is released for execution.

16. The non-transitory storage medium as recited in claim 10, wherein when the networking call is not requesting data, the system call is released for execution.

17. The non-transitory storage medium as recited in claim 10, wherein when the classification is public, or there is no classification, the networking call is released for execution.

18. The non-transitory storage medium as recited in claim 10, wherein the application comprises ransomware, and terminating the system call prevents encryption of the data by the application.

\* \* \* \* \*